Oct. 20, 1953      E. P. NEHER      2,655,798

FLEXIBLE SHAFT COUPLING

Filed Dec. 28, 1950      2 Sheets-Sheet 1

INVENTOR.
Eldon Paul Neher
BY
Evans & McCoy

INVENTOR.
Eldon Paul Neher
BY Evans & McCoy

Patented Oct. 20, 1953

2,655,798

UNITED STATES PATENT OFFICE 2,655,798

FLEXIBLE SHAFT COUPLING

Eldon Paul Neher, North Manchester, Ind., assignor to The General Tire and Rubber Company, Akron, Ohio, a corporation of Ohio Application December 28, 1950, Serial No. 203,061

13 Claims. (Cl. 64—14)

This invention relates to flexible shaft couplings of the type in which relatively movable coupling members are yieldably connected in such manner as to maintain a driving connection when the coupling members are disposed with their axes slightly offset or with their axes at an inclination.

The coupling of the present invention comprises two or more coupling members each provided with circumferentially spaced axially extending arms that are disposed in interfingering relation with arms of another coupling member, each arm being provided with a radially projecting driving lug and the interfingered arms of the coupling members being surrounded by a yieldable coupling sleeve in the form of an annular body of elastic rubber having internal sockets to receive the driving lugs. The sockets of the coupling sleeve are so positioned that the coupling members are held in axially spaced relation with their torque arms spaced apart circumferentially. Torque is transmitted from one coupling member to the other through portions of the elastic rubber body that are interposed between the lugs of the coupling members and, in order to permit the said portions of the elastic rubber body to distort sufficiently to provide a yielding driving connection, radial clearance is provided between the interior of the annular rubber body and the torque arms. In order to prevent excessive distortion of the elastic rubber body under heavy torque loads, the rubber body may be confined within a shell of distortion resistant material such as sheet metal which closely surrounds the annular rubber body and holds the outer periphery thereof against distortion.

The invention has for its object to provide an inexpensive coupling of the character described which is durable and efficient in operation.

Reference should be had to the accompanying drawings forming a part of this specification in which.

Figure 3:
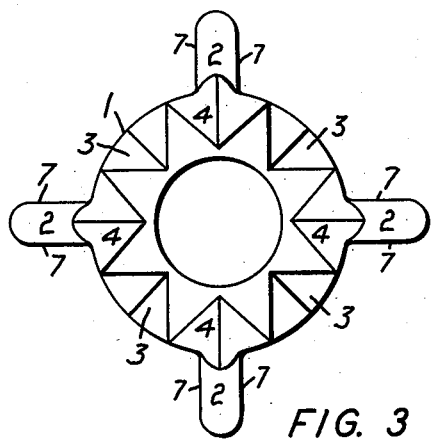
Fig. 3 is an end elevation of one of the two identical coupling members.
Figure 4:
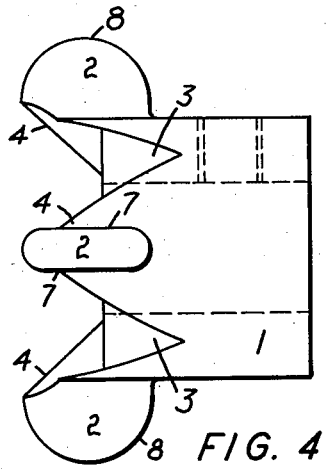
Fig. 4 is a side elevation of the coupling member shown in Fig. 3.
Figure 5:
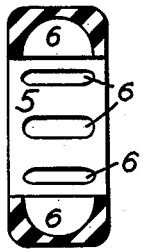
Fig. 5 is an axial section through the rubber cushioning annulus.

In Figs. 1 to 5 of the drawing there is shown a flexible coupling employing two substantially identical coupling members 1 adapted to be secured to the ends of the shafts to be joined, the coupling members 1 being of substantially cylindrical form and each having a row of circumferentially spaced driving lugs 2 projecting radially outwardly therefrom. The driving lugs 2 are equiangularly spaced about the axis of the coupling member and V-shaped recesses or notches 3 are provided between the driving lugs 2 to provide V-shaped torque arms 4 between successive recesses 3 which are adapted to enter the recesses of the companion coupling member to dispose the torque arms of the members in interfingered relation.

The two coupling members are held in axially spaced relation and with the torque arms thereof spaced apart circumferentially by means of a coupling sleeve comprising an annular body 5 of elastic rubber which is provided with circumferentially spaced sockets 6 which receive the driving lugs 2 of the coupling members. The driving lugs 2 have flat parallel side faces lying in planes parallel to the axis of the coupling members and the sockets 6 also have flat parallel side walls 7 between which the lugs 2 have a sliding fit.

Figure 1:
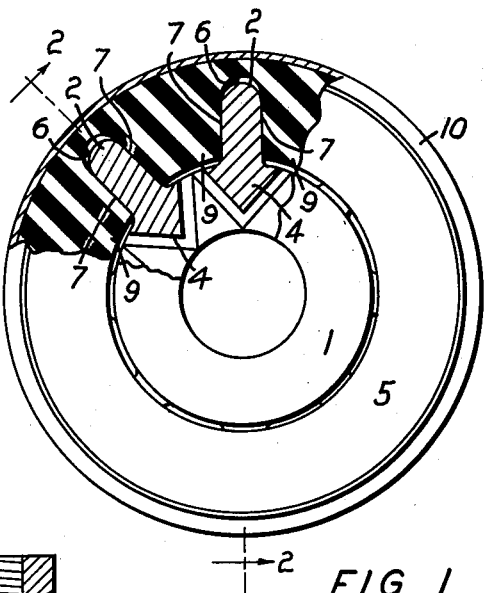
Figure 1 is an end elevation of a coupling embodying the invention with a portion broken away and shown in transverse section.
Figure 2:
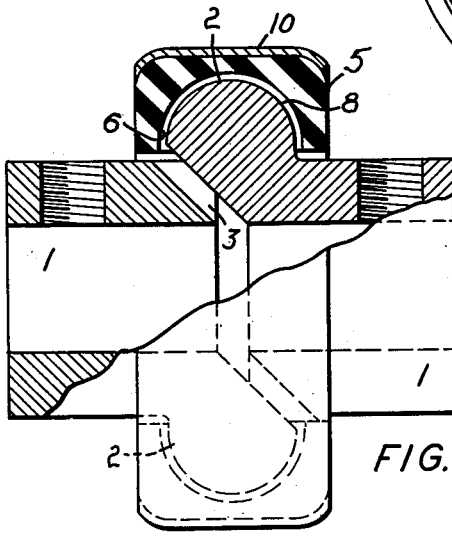
Fig. 2 is a view partially in side elevation and partially in longitudinal section on the line indicated at 2—2 in Fig. 1.
Figure 6:
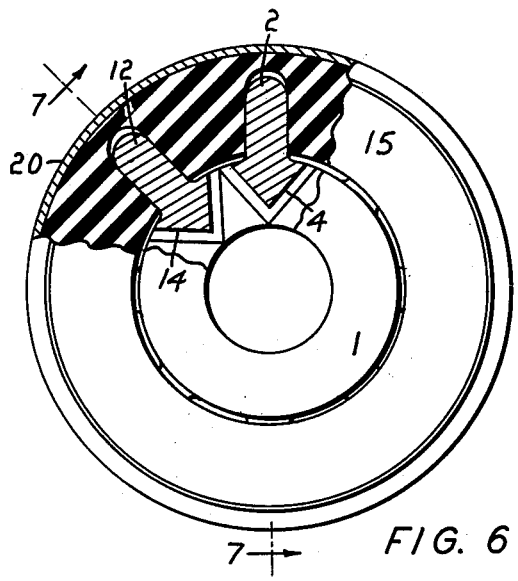
Fig. 6 is an end elevation partially in transverse section, showing a modified form of coupling.
Figure 9:
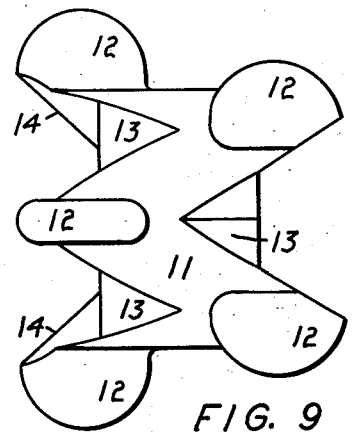
Fig. 9 is a side elevation of the intermediate coupling member.
Figure 8:
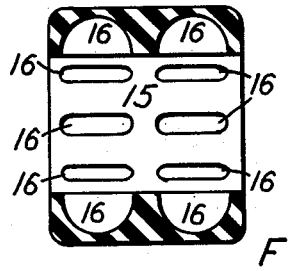
Fig. 8 is an axial section through the elastic rubber cushioning annulus.
Figure 10:
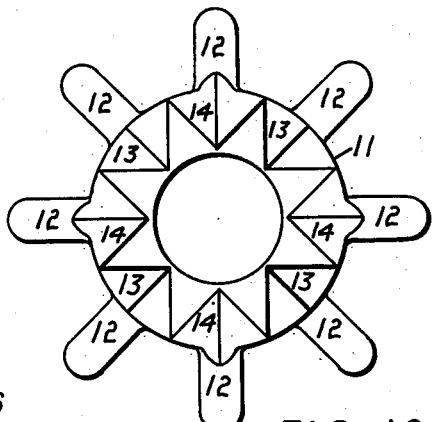
Fig. 10 is an end elevation of the coupling member shown in Fig. 9.
Figure 7:
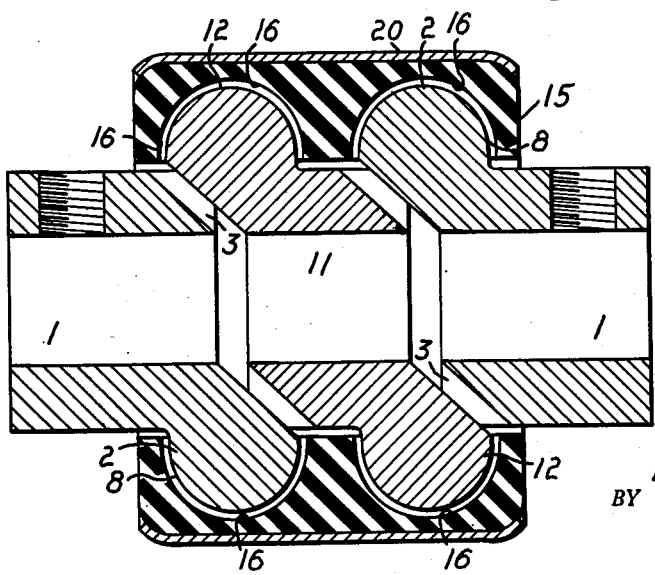
Fig. 7 is an axial section taken on the line indicated at 7—7 in Fig. 6.

As shown in Figs. 1 and 2, the internal diameter of the rubber annulus 5 is slightly greater than the external diameter of the coupling members, so that there is radial clearance between the torque arms 4 and the annulus 5. The driving lugs 2 preferably have outer edges 8 of substantially semi-circular form and the bottoms of the sockets 6 are also substantially semi-circular, the depth of the sockets 6 being preferably such that there is radial clearance between the the lugs 2 and the bottoms of the sockets 6.

Driving torque is transmitted from one coupling member to the other through the portions of the elastic rubber body 5 that are between the sockets 6. These portions of the body 5 provide inwardly tapering bodies of rubber 9 through which torque thrusts are transmitted from the driving lugs of one coupling member to the lugs of the other. The clearance provided between the interior of the rubber annulus 5 and the exterior of the coupling members, and between the tips of the driving lugs 2 and the bottoms of the sockets 6 permits the portions 9 of the body 5 to be distorted when subjected to pressure by a relative movement of the driving lugs, so that a yieldable connection is provided between the coupling members that permits the relative movements of the coupling members that are necessary to provide universal driving connection.

In order to prevent excessive distortion of the rubber annulus 5 under heavy torque loads, the annulus 5 may be enclosed within a distortion resistant shell 10 of sheet metal which engages the periphery of the rubber body 5.

Clearance between the lugs 2 and the bottom of the sockets 6 permits the coupling members to have slight relative axial movements when the two coupling members are axially alined. Misalinement of the axes of the coupling members causes certain of the intermediate portions of the rubber body to be placed under compression, the portions 9 being sufficiently yieldable to readily permit of slight offsetting of the axes of the coupling members, or an angularity between the said axes. During rotation of the coupling members with their axes misalined, the portions 9 of the rubber body are subjected to compression during portions of each revolution, and are relieved of pressure during other portions of the revolution, so that the rubber is subjected to continual working, as is desirable for maintaining long life of an elastic rubber body.

In Figs. 6 to 10 a modified form of coupling member is shown which is adapted to permit greater misalinement of the connecting shafts than is provided by the coupling shown in Figs. 1 to 5. In this modification the same coupling members I are employed, which are adapted to be attached to the ends of the shafts to be coupled, and an intermediate coupling member 11 is provided between the two coupling members 1. The coupling member 11 preferably has an external diameter substantially the same as the coupling members 1 and is provided at each end thereof with a circumferential row of driving lugs 12 which are equiangularly spaced about the axis of the member 11, the lugs 12 at one end of the coupling member being offset with respect to the lugs 12 at the opposite end and midway between the said lugs.

Each end of the coupling member 11 is provided with V-shaped recesses or notches 13 between successive lugs, which provide axially extending torque arms 14 for each of the lugs 12. The recesses 13 of the intermediate coupling member 11 are identical with the recesses of the coupling members 1 and the coupling member is disposed with its torque arms interfingered with the torque arms of the two coupling members 1. The coupling members are yieldingly held in axially spaced relation and with their torque arms circumferentially spaced by means of an annular body 15 of elastic rubber that is provided with circumferential rows of sockets 16 which receive the driving lugs 2 and 12.

As in the modification first described, the elastic annulus 15 is of an internal diameter greater than the external diameter of the coupling members, so as to provide radial clearance between the torque arms and the rubber body, and clearance is also provided between the tips of the driving lugs 2 and 12 and the bottoms of the sockets 16 in the rubber body, so that the portions of the rubber body between the driving lugs can be subjected to the distortion necessary to permit slight relative movements between the coupling members, the rubber body 15 being enclosed within an outer shell 20 of distortion resistant material such as sheet metal to prevent excessive distortion under heavy torque loads. By providing one or more intermediate coupling members 11 between the coupling members 1, the amount of misalinement permissible between the connecting shafts can be substantially increased.

In either modification of the invention the elastic rubber annulus may be stretched and placed around the coupling members with the driving lugs of the coupling in the sockets of the rubber annulus, after which the outer sheet metal shell may be placed upon the rubber annulus and the edges thereof may be turned inwardly to retain the shell on the rubber annulus.

It is to be understood that variations and modifications of the specific devices herein shown and described for purposes of illustration, may be made without departing from the spirit of the invention.

What I claim is:

1. A flexible shaft coupling comprising two coupling members having axially extending torque arms that are interfingered and spaced circumferentially around a center, each arm having a driving lug projecting radially outwardly therefrom, and a yieldable positioning and connecting sleeve surrounding said torque arms and comprising an annular body of elastic rubber, said rubber body having sockets opening to the interior thereof intermediate its ends in which said lugs engage, the sockets receiving the lugs of one coupling member alternating with sockets receiving the lugs of the other coupling member circumferentially of said annular body, said sockets opening to the interior thereof being positioned axially and circumferentially of said body to axially space said coupling members and circumferentially space said arms.

2. A flexible shaft coupling comprising two coupling members having axially extending torque arms that are interfingered and spaced circumferentially around a center, each arm having a driving lug projecting radially outwardly therefrom, and a yieldable positioning and connecting sleeve surrounding said torque arms and comprising an annular body of elastic rubber, said rubber body having sockets opening to the interior thereof intermediate its ends in which said lugs engage, the sockets receiving the lugs of one coupling member alternating with sockets receiving the lugs of the other coupling member circumferentially of said annular body, said sockets opening to the interior thereof being axially elongated and having parallel side walls between which the said lugs have a sliding fit, said sockets being positioned circumferentially of the body to circumferentially space said arms.

3. A flexible shaft coupling comprising two coupling members having axially extending torque arms that are interfingered and spaced circumferentially around a center, each arm having a driving lug projecting radially outwardly therefrom, and a yieldable positioning and connecting sleeve surrounding said torque arms and comprising an annular body of elastic rubber, said rubber body having sockets opening to the interior thereof intermediate its ends in which said lugs engage, said rubber body having an internal diameter greater than the coupling members to provide radial clearance between said arms and said body, said sockets being axially elongated and having parallel side walls between which said lugs have a sliding fit, said sockets being positioned circumferentially of the body to circumferentially space said arms.

4. A flexible shaft coupling comprising two coupling members having axially extending torque arms that are interfingered and spaced circumferentially around a center, each arm having a driving lug projecting radially outwardly therefrom, and a yieldable positioning and connecting sleeve surrounding said torque arms and comprising an annular body of elastic rubber, a shell of distortion resistant material surrounding and peripherally engaging said rubber body, said rubber body having sockets opening to the interior thereof intermediate its ends in which said lugs engage, said sockets being positioned axially and circumferentially of said body to axially space said coupling members and circumferentially space said arms.

5. A flexible shaft coupling comprising two coupling members, each having a substantially cylindrical end portion provided with circumferentially spaced axially extending recesses that provide circumferentially spaced torque arms between them, said coupling members being disposed with their torque arms interfingered, each torque arm having an axially elongated driving lug projecting outwardly therefrom, each lug having parallel flat axially extending side faces, and a coupling sleeve surrounding said torque arms and comprising an annular body of elastic rubber provided with internal sockets intermediate its ends in which said lugs engage, said annular body being of an internal diameter greater than the external diameter of said end portions of the coupling member to permit distortion of portions of the rubber body between said sockets, said sockets having axially extending side walls between which said lugs have a sliding fit, said sockets being positioned circumferentially of said body to circumferentially space said arms.

6. A coupling such as defined in claim 5 in which the axially extending recesses in the ends of the coupling members and the arms between said recesses are V-shaped, the said recesses being equiangularly spaced.

7. A flexible coupling comprising two coupling members each having a series of axially extending torque arms equiangularly spaced about its axis, said coupling members being disposed with their torque arms interfingered, each of said arms having an axially extending driving lug projecting outwardly therefrom, and a yieldable positioning and connecting sleeve surrounding said interfingered arms and comprising an annular body of elastic rubber provided with axially extending internal sockets intermediate its ends that are of a width to slidably receive said driving lugs and that are positioned circumferentially of the body to circumferentially space said arms, said body being of an internal diameter greater than the interfingered portion of the coupling to provide radial clearance between the external faces of said arms and said rubber body to allow distortion under pressure of portions of the rubber body between said driving lugs.

8. A flexible coupling such as defined in claim 7 in which each driving lug and each lug receiving socket is substantially semicircular in axial section.

9. A flexible shaft coupling comprising a series of coupling members, each having axially extending torque arms spaced circumferentially about its axis, said members being alined with their torque arms in interfingered relation, each torque arm having a driving lug projecting radially outwardly therefrom, and a yieldable positioning and connecting sleeve surrounding said torque arms and comprising an annular body of elastic rubber surrounding said torque arms and having a plurality of circumferential rows of sockets into which said lugs project, said annular rubber body being of an internal diameter to provide radial clearance between said torque arms and the interior thereof.

10. A flexible shaft coupling such as defined in claim 9 in which the driving lugs have flat parallel axially extending side walls and the sockets of the rubber body have flat axially extending side walls between which the lugs have a sliding fit.

11. A flexible shaft coupling comprising two coupling members having axially extending torque arms spaced circumferentially about its axis, an intermediate coupling member having axially extending torque arms at both ends thereof which are interfingered with the torque arms of said two members, each torque arm having a driving lug projecting radially outwardly therefrom, the driving lugs of said coupling members being disposed in axially spaced circumferential rows, and a yieldable positioning and connecting sleeve surrounding said torque arms and comprising an annular body of elastic rubber having two axially spaced circumferential rows of internal lug receiving sockets that are positioned axially and circumferentially of said body to axially space said coupling members and to circumferentially space said torque arms.

12. A coupling such as defined in claim 11 in which the elastic rubber body is of an internal diameter to provide radial clearance between the external faces of said torque arms and said body to permit distortion under pressure of portions of the rubber body between said driving lugs.

13. A coupling such as defined in claim 12 in which a shell of distortion resisting material surrounds the elastic rubber body in contact with the periphery thereof.

ELDON PAUL NEHER.

References Cited in the file of this patent

UNITED STATES PATENTS

| Number | Name | Date |
|---|---|---|
| 1,668,330 | Morse | May 1, 1928 |
| 1,992,528 | Geyer | Feb. 26, 1935 |
| 2,079,460 | Marty | May 4, 1937 |
| 2,537,847 | Neher | Jan. 9, 1951 |

FOREIGN PATENTS

| Number | Country | Date |
|---|---|---|
| 224,150 | Great Britain | 1924 |